United States Patent

[11] 3,628,817

[72] Inventors Edward J. Sheahan
 Dearborn Heights;
 Donald F. Staisil, Livonia, both of Mich.
[21] Appl. No. 80,421
[22] Filed Oct. 13, 1970
[45] Patented Dec. 21, 1971
[73] Assignee Ford Motor Company
 Dearborn, Mich.

[54] HOOD LATCH ASSEMBLY
 8 Claims, 5 Drawing Figs.
[52] U.S. Cl............................................. 292/247,
 292/66, 292/113, 292/DIG. 14, 292/DIG. 49
[51] Int. Cl....................................... E05c 5/00,
 E05c 19/14
[50] Field of Search............................................. 292/66, 67,
 113, 114, 247, 248, 250, DIG. 14, DIG. 31, DIG. 49

[56] References Cited
 UNITED STATES PATENTS
| | | | |
|---|---|---|---|
| 1,570,621 | 1/1926 | Crum | 292/66 |
| 1,822,164 | 9/1931 | Moore | 292/114 |
| 1,842,557 | 1/1932 | Mears | 292/114 X |
| 2,951,722 | 9/1960 | Swanson | 292/247 |
| 3,259,411 | 7/1966 | Griffiths | 292/113 |

Primary Examiner—Robert L. Wolfe
Attorneys—John R. Faulkner and John J. Roethel

ABSTRACT: A spring-loaded overcenter latch assembly for latching a vehicle body closure, such as a hood, to a vehicle body structure. An auxiliary latch device maintains the primary latch element of the latch assembly in its overcenter relationship even under severe vehicle jounce conditions that could tend to cause disengagement of the primary latch element from its coacting keeper device.

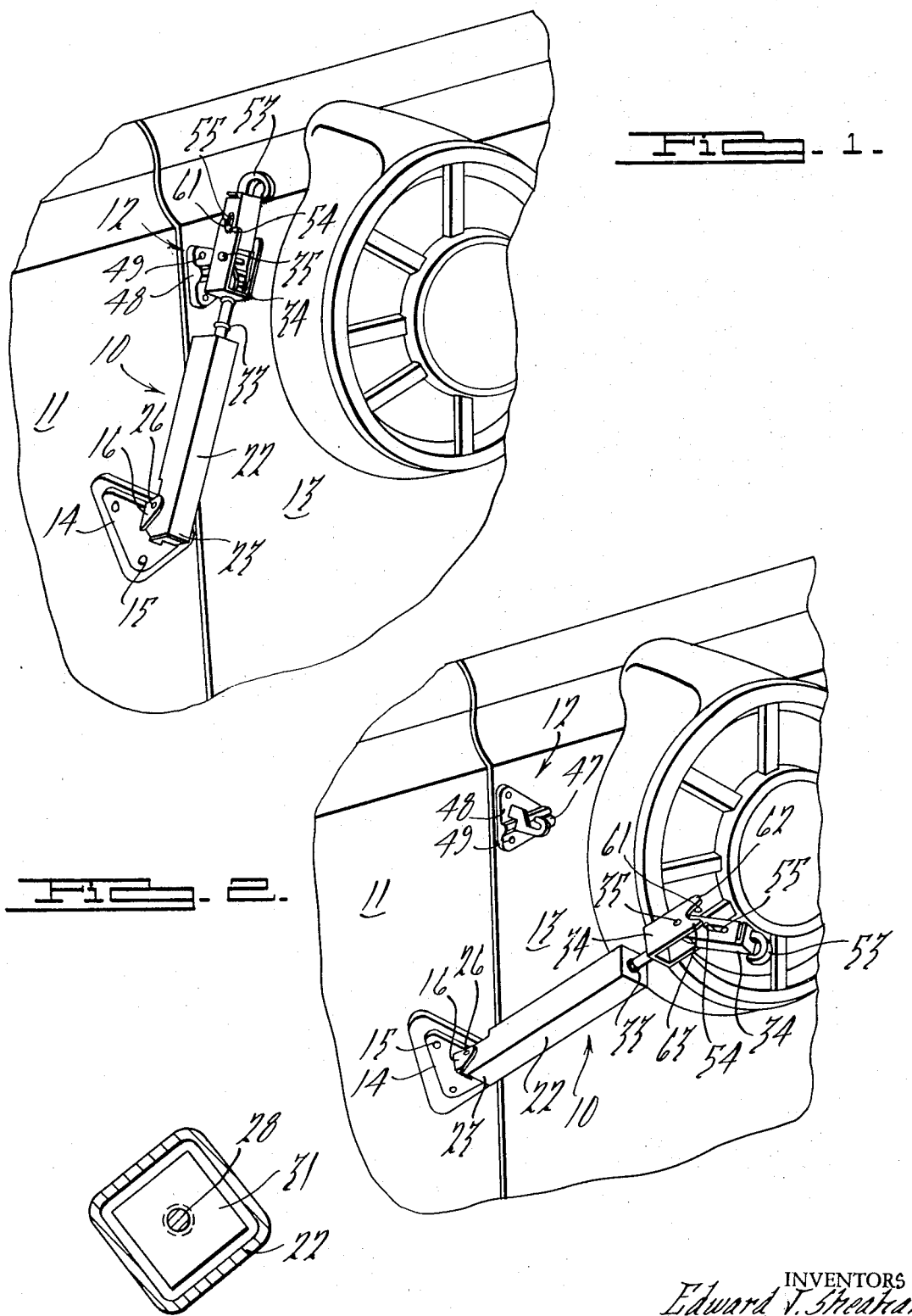

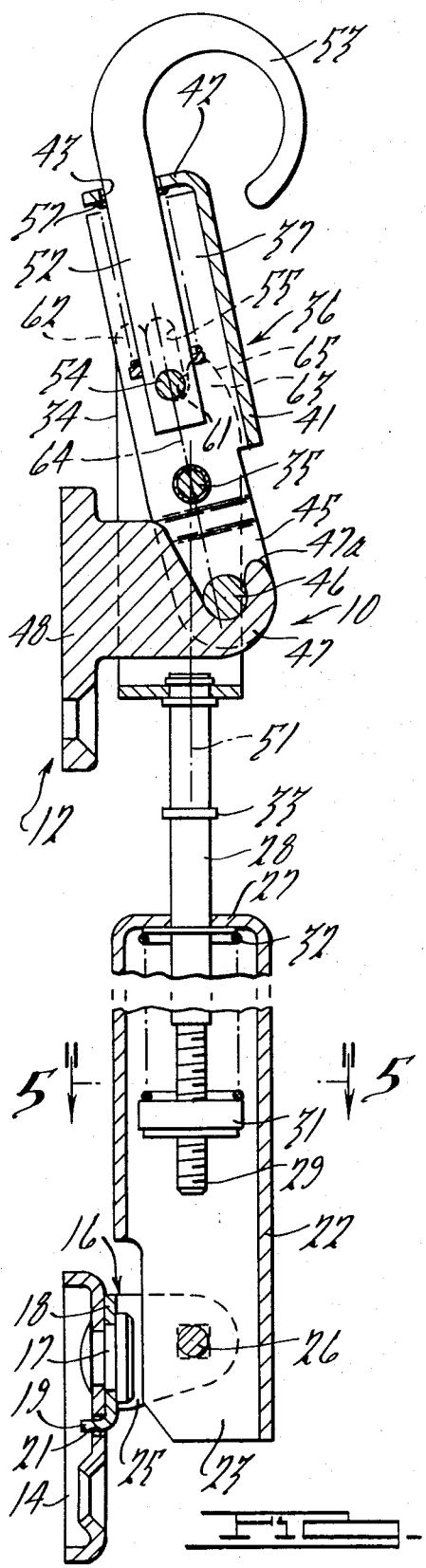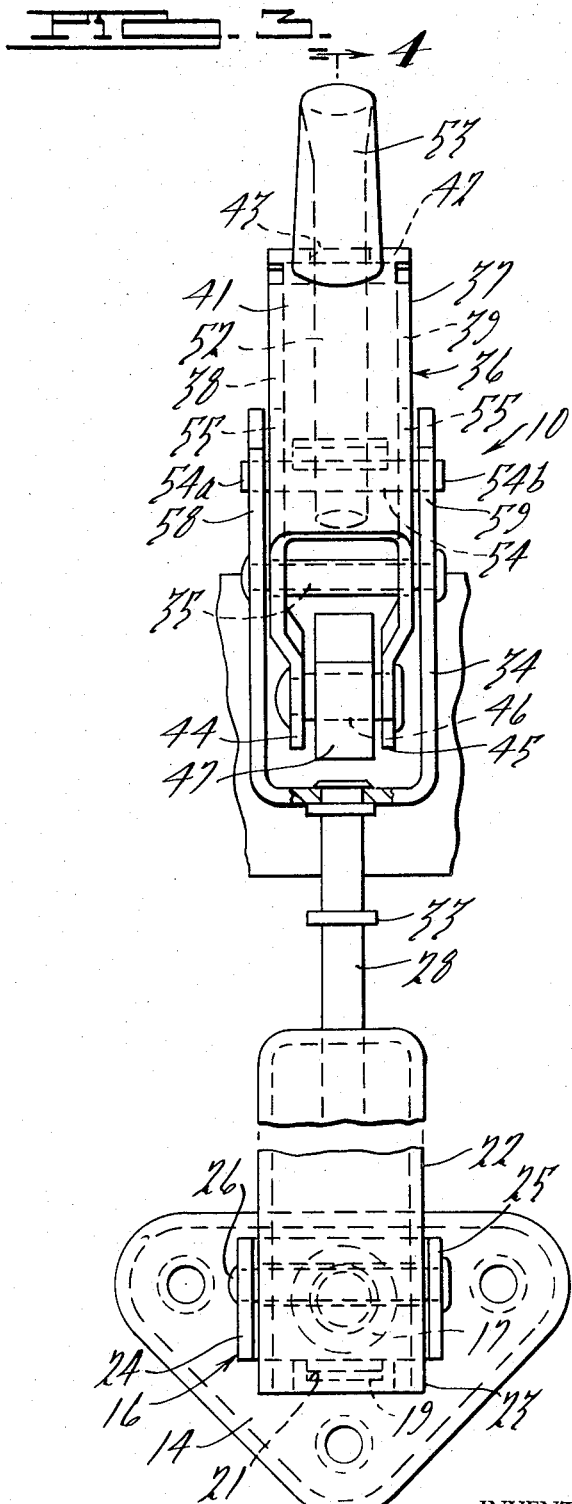

HOOD LATCH ASSEMBLY

BACKGROUND OF THE INVENTION

Overcenter latch assemblies for latching a vehicle body closure such as a hood to a vehicle body structure are well documented in the prior art. U.S. Pat. No. 1,382,322 issued June 21, 1921 to W. A. Schleicher is an example of one such device. The Schleicher latch mechanism has a primary latch element engaging a keeper device and a compression spring to maintain the latched condition of the latch assembly. Under severe jounce conditions, however, relative movement of the closure panel to the vehicle body structure could result in sufficient release of the spring compression to permit the handle to be thrown in a direction to disrupt the overcenter relationship whereupon the closure panel could become unlatched from the body structure.

It is an object of the present invention to provide an auxiliary latch device to maintain the overcenter relationship of the primary latch device even under the most unfavorable conditions.

SUMMARY OF THE INVENTION

The present invention relates to a latch assembly mounted on a vehicle body panel for engagement with a keeper device carried on a closure panel for latching a closure to a vehicle body. The latch assembly has a support means pivotally mounted on the body panel and a primary latch device means including a latch element pivotally mounted on the support means. The primary latch device means includes a primary spring means compressible against a part of the support means upon latching engagement of the primary latch device means with its keeper device mounted on the vehicle body structure. The primary latch device in latched condition has overcenter engagement with the keeper device relative to the direction of force exerted by the compressed primary spring means. The improvement in the latch assembly comprises an auxiliary latch device which is coupled by a connecting means to the latch element. The auxiliary latch device coacts with a keeper means carried on the latch assembly support means. A secondary spring means holds the auxiliary latch device in engagement with the auxiliary keeper means to maintain the latch element in its overcenter keeper device engaging relationship when the latter is in latched condition. A handle means is provided which is operable to sequentially release the auxiliary latch device from its keeper means and the latch element from its keeper device to unlatch the closure from the vehicle body.

More particularly, the handle means has an extension projecting into a retainer integral with the latch element. The auxiliary latch device has a latching pin extending laterally of the extension. Connecting means coupling the auxiliary latch device to the latch element comprises end portions of the latching pin projecting through longitudinally extending slots in the retainer. The slots are of sufficient length to permit disengagement of the latching pin from the auxiliary keeper means against the resistance of the secondary spring means prior to disengagement of the latch element from its keeper device. The secondary spring means comprises a compression spring encompassing the handle means extension within the retainer.

In latched condition, the longitudinal axis of the retainer slots lie in a plane passing through the pivot axis of the latch element between the overcenter latched position of the latter and the direction of the force exerted by the primary spring means.

DESCRIPTION OF THE DRAWING

Further features and advantages of the present invention will be explained in greater detail making reference to the description, which now follows, reference being had to the drawings, in which:

FIG. 1 is a perspective view of the hood latch assembly embodying the present invention in latched condition on the vehicle body;

FIG. 2 is a perspective view of the hood latch assembly in unlatched condition;

FIG. 3 is a plan view of the hood latch assembly;

FIG. 4 is a section view on the line 4—4 of FIG. 3; and

FIG. 5 is a section view on the line 5—5 of FIG. 4.

DETAILED DESCRIPTION OF THE INVENTION

Referring now to the drawings, the latch assembly generally designated 10 is adapted to be mounted on a vehicle body panel 11 for engagement with a keeper device 12 carried on a closure structure panel 13, such as a vehicle hood panel. The latch assembly 10 has a pivot base 14 adapted to be bolted as at 15 to the body panel 11. The pivot base 14 supports a pivot bracket or clevis 16, the latter being fastened to the base by a shoulder rivet 17. The base 18 of the pivot bracket 16 has a tang 19 projecting into a slot 21 in the pivot base 14 which permits a limited degree of rotational movement about the axis of the shoulder rivet 17 so that the latch assembly 10 may within limits properly align itself with the keeper device 12

A barrel member 22 is pivotally supported at its lower end 23 between the upstanding legs 24 and 25 of the pivot bracket 16 on a pin or shaft 26. The barrel member 22 is an elongated hollow tube of generally square cross section closed at its upper end by an apertured end wall 27.

An elongated bolt or rod 28 projects through the apertured end wall 27 of the barrel member 22. The end 29 of the rod within the barrel member is threaded to receive a nut 31, see FIGS. 4 and 5. Between the nut 31, and the apertured end wall 27 of the barrel member 22 is a compression spring 32 which is the primary spring means of the latch assembly 10. The spring 32 urges the rod 28 toward a retracted position in the barrel member to the maximum extent permitted by a stop ring 33 located on the rod intermediate its ends. The nut 31 provides a means for adjusting the compression or preload on the spring 32 whereby the force required to pull the rod 28 out of the barrel member may be adjusted as desired. The square nut 31 held within the substantially square barrel member 22 causes the compression of spring 32 to be decreased or increased depending on which direction the rod 28 is rotated, as will be readily understood.

A U-shaped bracket 34 is secured to the upper end of the rod 28. The U-shaped bracket 34 pivotally supports on a pivot pin 35 extending between its side legs a latch handle assembly, generally designated 36.

The latch handle assembly 36 comprises a channel-shaped retainer 37 having two parallel sides 38 and 39 and a third partial side 41 extending between the sides 38 and 39. This third side 41 is formed over at the top of the retainer to form an upper end wall 42 having an aperture 43 therein.

The lower ends 44 and 45 of the retainer sidewalls 38 and 39, respectively, have extending therebetween an elongated rivet or pin 46 which is the primary latching pin of the handle assembly. As best seen in FIG. 4, the latching pin 46 in latched condition of the latch assembly 10 is seated in a hooklike end portion 47 of the keeper device 12, the latter having a base portion 48 adapted to be secured by bolts 49 to the panel 13 of the closure structure or vehicle body.

In latched condition the primary latch pin 46 lies in an overcenter relationship to the longitudinal axis of the rod 28, this axis being indicated by the line 51, It will be noted that the axis 51 passes through the center of the pin 35 about which the handle assembly 36 pivots.

In a conventional latching assembly of the type generally disclosed, the latching pin 46 will be released from the hook portion 47 of the keeper device 12 by manually pulling on the channel-shaped retainer 37 to raise and rotate the latter in a clockwise direction about the pivot pin 35 carried by the bracket 34. As soon as the latching pin 46 is clear of the upper lip 47a of the hook portion 47 of the keeper device, the latch assembly can be moved from a position corresponding to the latched condition shown in FIG. 1 to the unlatched condition shown in FIG. 2. To this point a more or less conventional single stage latching mechanism has been described. In such a single stage mechanism it is possible for the latch assembly to become disengaged from the keeper device through the play between vehicle body components as the vehicle bounces over rough terrain. The downward or compression force of the spring may be momentarily released and the latch pin 46 then is able to shift out of its overcenter relationship to the keeper device. In effect it is jounced out of the pocket of the keeper device permitting the closure structure to become unlatched from the body structure.

The present invention embodies an auxiliary latch device as a part of the latch handle assembly 36 which has as its primary function the maintenance of the overcenter relationship of the latch pin 46 to the keeper device hook portion 47 even if there is relative movement between the closure structure and the vehicle body panel as a result of the vehicle being driven over rough terrain.

The auxiliary latch device comprises an extension 52 on the handle 53 of the latch handle assembly 36. The handle extension 52 projects through the aperture 43 in the retainer upper end wall 42. A secondary latching pin 54 is carried by and extends laterally of the handle extension 52. The ends 54a and 54b of the pin 54 project through aligned longitudinally extending slots 55 in the respective sidewalls 38–39 of the retainer 37. Resting on top of the laterally extending latching pin 54 is a washer 56 encompassing the extension 52. Between the washer 56 and the upper end wall 42 of the retainer 41 is a compression spring 57. The spring 57 urges the handle extension 52 downwardly into the retainer. The downward movement is limited by engagement of the pin ends 54a with the bottom of the slots 55. Upward movement of the handle and its extension is against the force of the compression spring 57 and is limited by the lengths of the slot 55.

The upper leg ends 58 and 59 of the U-shaped bracket 34 are provided with retaining cams or notches 61. The cams or notches 61 are the equivalent of open ended slots having one sidewall defined by an elongated leg 62 and the other sidewall by a rounded sidewall 63.

In latched condition of the latch assembly a line 64 passing through the center of secondary latch pin 54 and the center of pivot pin 35 passes between the longitudinal axis 51 of the rod 28 and the center of the primary latching pin 46.

OPERATION OF THE LATCH ASSEMBLY

As shown in FIGS. 1, 3 and 4, the latch assembly 10 is in latched condition or in a condition to hold the panel 13 in closed relationship to the body structure panel 11. To unlatch the latch assembly it is necessary that a lifting force be applied to the handle 53. Sufficient force must be applied to raise the handle extension 52 and the secondary latching pin 54 against the resistance of the compression spring 57 to the extent that the latching pin ends 54a and 54b will be movable over the rounded ends of the short legs 63 on the upper ends of the U-shaped bracket 34. As the spring 57 is placed under compression, an upward force is exerted on the retainer 37 causing the latter and its supporting rod 28 to be raised upwardly against the resistance of the compression spring 32. Full upward movement of the retainer 37 may not occur until the secondary latch pin ends 54a and 54b engage the upper ends of the respective slots 55 in the retainer sidewalls 38 and 39. But once all of the force that is being exerted on the handle 53 is applied to the retainer, it then becomes possible to lift the primary latching pin 46 out of the pocket of the end portion 47 of the keeper device 12. As the handle 53 is being raised upwardly it also can be pulled outwardly away from the body panel so as to rotate the channel-shaped retainer about the axis of the pivot pin 35 on the upper end of the bracket 34 causing the latch handle assembly 10 parts to be swiveled about the pivot axis 26 to the position as shown in FIG. 2.

To cause the latch assembly to be restored to a latched condition after being unlatched, it is only necessary to direct the latch handle assembly 36 toward the keeper device with the latch pin 46 aimed in a direction to pass over the lip 47a of the keeper device portion 47. Once the latch pin 46 passes over the lip 47a, continued pressure applied to the handle 53 toward the body panel will result in the retainer 37 being rotated about the pivot axis of the pivot pin 35. The secondary latch pin 54 will about the cam surface 65 of the short leg 63 at the upper end of the bracket causing the secondary latch pin 54 to be cammed upwardly and over the top of the short legs 63 whereupon the compression spring 57 will cause it to drop into the notch between the two sets of legs 62 and 63.

With the secondary latch pin 54 seated in its retaining notches and the primary latch pin 46 seated in the pocket in the keeper device portion 47, the closure panel 13 is then in latched condition relative to the vehicle body structure 11.

Even if the vehicle is driven over rough terrain causing the panels to move relative to one another to the extent that there might be a possibility that the primary latch pin 46 could bounce out of its retaining pocket in the keeper device, the latch pin 46 is held in its overcenter relationship to the axis of the support rod 51 by the secondary latch pin 54. In effect, the retainer 37 is prevented from flipping over about its pivot axis 35 so that the latch pin 46 could swing to a position in which it could become disengaged from the keeper device portion 47.

It is to be understood that this invention is not limited to the exact construction illustrated and described but that various changes and modifications may be made without departing from the spirit and scope of the invention as defined in the appended claims.

We claim:

1. A latch assembly mounted on a vehicle body panel for engagement with a keeper device carried on a closure panel for latching a closure to a vehicle body, the latch assembly having:

support means pivotally mounted on the body panel, and a primary latch device means including a latch element pivotally mounted on the support means, the primary latch device means including primary spring means compressible against a part of the support means upon latching engagement of the primary latch device means with its keeper device, the primary latch device in latched condition having overcenter engagement with the keeper device relative to the direction of force exerted by the compressed primary spring means, wherein the improvement comprises:

an auxiliary latch device, connecting means coupling the auxiliary latch device to the latch element, auxiliary keeper means carried on the support means, secondary spring means holding the auxiliary latch device in engagement with the auxiliary keeper means to maintain the latch element in its overcenter keeper device engaging relationship when in latched condition, and handle means operable to sequentially release the auxiliary latch device from its keeper means and the latch element from its keeper device to unlatch the closure from the vehicle body.

2. A latch assembly according to claim 1, in which:

the handle means has an extension projecting into a retainer integral with the latch element, the auxiliary latch device has a latching pin extending laterally of the extension, and the connecting means coupling the auxiliary latch device to the latch element comprises end portions of the latching pin projecting through longitudinally extending slots in the retainer, the slots being of sufficient length to permit disengagement of the latching pin from the auxiliary keeper means against the resistance of the secondary spring means prior to disengagement of the latch element from its keeper device.

3. A latch assembly according to claim 2, in which:

the secondary spring means comprises a compression spring encompassing the handle means extension within the retainer.

4. A latch assembly according to claim 2, in which:
the longitudinal axis of the retainer slots lies in a plane passing through the pivot axis of the latch element between the overcenter latched position of the latter and the direction of force of the primary spring means.

5. A latch assembly mounted on a vehicle body panel and engageable with a keeper device carried on a hood panel for latching the hood to the vehicle body,
the latch assembly having a base secured to the body panel,
a barrel member pivotally mounted at one end on the base,
a rod projecting longitudinally through the other end of the barrel member,
spring means carried within said barrel member urging the rod in a retracting direction within the barrel member,
a bracket carried on the projecting end of the rod, and a handle assembly comprising a retainer pivotally mounted intermediate the ends thereof on the bracket,
the retainer carrying at one end thereof a laterally extending primary latching pin engageable with the keeper device with the rod extended from the barrel member to place the spring means under compression in latched condition, and
a handle mounted on the retainer for pulling the latter against the resistance of the spring means and for rotating the latter about the pivot in a direction to disengage the pin from the keeper device,
wherein the improvement comprises an auxiliary latch device in which:
the handle has an elongated extension projecting into the retainer,
a secondary latching pin is carried by and extends laterally of the extension and projects through longitudinally extending slots in the walls of the retainer,
the secondary latching pin and slots being located on the side of the retainer pivot opposite to that of the primary latching pin, and
a secondary keeper on the end of the bracket receives the secondary latch pin to restrain the latch handle assembly against movement from latched position.

6. A latch assembly according to claim 5, in which:
the primary latch pin has an overcenter latching relationship with its keeper in latched condition, and
the secondary latch pin and the secondary keeper engage along a latching line that is angularly offset relative to the longitudinal axis of the bracket carrying rod to maintain the primary latch in its overcenter latched relationship to its keeper when in latched condition.

7. A latch assembly according to claim 6, in which:
a compression spring encompasses the handle extension within the retainer to urge the secondary latch pin in secondary keeper engaging direction.

8. A latch assembly according to claim 5, in which:
a compression spring encompasses the handle extension within the retainer to urge the secondary latch pin in secondary keeper engaging direction.

* * * * *